United States Patent
Brown et al.

(10) Patent No.: US 10,653,266 B1
(45) Date of Patent: May 19, 2020

(54) COFFEE GROUNDS STIRRING DEVICE

(71) Applicant: Caffeine Innovations, LLC, Chandler, AZ (US)

(72) Inventors: Matthew S. Brown, Gilbert, AZ (US); Samuel T. Fulton, Telluride, CO (US); Thomas G. Pittman, Gilbert, AZ (US); Carl TenBrink, Huntington Beach, CA (US)

(73) Assignee: Caffeine Innovations, LLC, Chandler, AZ (US)

( * ) Notice: Subject to any disclaimer, the term of this patent is extended or adjusted under 35 U.S.C. 154(b) by 610 days.

(21) Appl. No.: 15/348,805

(22) Filed: Nov. 10, 2016

Related U.S. Application Data (60) Provisional application No. 62/253,351, filed on Nov. 10, 2015.

(51) Int. Cl.
*A47J 31/06* (2006.01)
*A47J 31/18* (2006.01)
*A47J 43/07* (2006.01)

(52) U.S. Cl.
CPC ........... *A47J 31/0631* (2013.01); *A47J 31/18* (2013.01); *A47J 43/0711* (2013.01)

(58) Field of Classification Search
None
See application file for complete search history.

(56) References Cited

U.S. PATENT DOCUMENTS

| | | | | |
|---|---|---|---|---|
| 3,985,069 | A | * | 10/1976 | Cavalluzzi ............. A47J 31/02 99/295 |
| 6,079,314 | A | * | 6/2000 | Mackinnon ............. A47J 31/32 99/289 R |
| 6,079,315 | A | * | 6/2000 | Beaulieu ............. A47J 31/3628 99/289 R |

(Continued)

FOREIGN PATENT DOCUMENTS

| CN | 2579301 Y | 10/2003 |
|---|---|---|
| CN | 201088389 Y | 7/2008 |

(Continued)

OTHER PUBLICATIONS http://www.target.com/p/icoffee-steambrew-12-cup-automatic-coffee-maker/-/A-17051318?ref=tgt_adv_XSG10001&AFID=google_pla_df&LNM=17051318&CPNG=Appliances&kpid=17051318&LID=3pgs&ci_src=17588969&ci_sku=17051318&kpid=17051318&gclid= CMDXju3OkscCFZFgfgodzLQOfA.
http://myeurostores.com/coffee-maxx-2go-thermo-star-coffee-machine-with-stirring-heated-mug-genuine-new.html.

*Primary Examiner* — Ibrahime A Abraham
*Assistant Examiner* — John J Norton
(74) *Attorney, Agent, or Firm* — Booth Udall Fuller, PLC (57) ABSTRACT

A coffee grounds stirring device comprising a stirring basket and a stirring assembly is disclosed. The stirring basket comprises a basket rim, a side wall, and a basket floor, and is releasably coupled to the stirring assembly. The stirring assembly is contained within the stirring basket and comprises a motor, at least one blade, a control circuit, and a sensor. The sensor is configured to detect a liquid inside the (Continued)

coffee grounds stirring device. The at least one blade is operatively coupled to the motor such that the control circuit drives the at least one blade with the motor to rotate above the basket floor in response to the sensor detecting liquid inside the coffee grounds stirring device. The coffee grounds stirring device may be sized to be entirely contained within a coffee basket from a 12-cup-capacity coffee maker. The at least one blade may be driven to rotate intermittently.

20 Claims, 8 Drawing Sheets

(56) References Cited

U.S. PATENT DOCUMENTS

| | | | |
|---|---|---|---|
| 6,817,279 B2 | 11/2004 | Leung et al. | |
| 8,146,487 B2 | 4/2012 | Nikolaas et al. | |
| 2008/0050491 A1* | 2/2008 | Ramus | A47J 31/56 426/520 |
| 2008/0148956 A1 | 6/2008 | Maurer | |
| 2009/0145302 A1 | 6/2009 | Dutertre et al. | |
| 2009/0178569 A1* | 7/2009 | Tucker | A47J 31/18 99/282 |
| 2011/0248108 A1* | 10/2011 | Carriere | A47J 43/0722 241/33 |
| 2012/0002501 A1* | 1/2012 | Ulstad | A47J 43/0465 366/205 |
| 2012/0121764 A1 | 5/2012 | Lai et al. | |
| 2013/0248627 A1* | 9/2013 | Huang | A47J 19/02 241/36 |
| 2014/0165845 A1* | 6/2014 | Issar | A47J 31/20 99/283 |
| 2015/0359380 A1* | 12/2015 | Oleksy | A47J 31/56 426/433 |

FOREIGN PATENT DOCUMENTS

| | | |
|---|---|---|
| CN | 203564110 | 4/2014 |
| JP | H0880255 A | 3/1996 |
| JP | 2003109107 | 4/2003 |
| JP | 5372459 B2 | 12/2013 |
| KR | 2020110002883 U | 3/2011 |

* cited by examiner

COFFEE GROUNDS STIRRING DEVICE

RELATED APPLICATIONS

This application claims the benefit of U.S. provisional patent application 62/253,351, filed Nov. 10, 2015 titled "Coffee Grinds Stirring Assembly," the entirety of the disclosure of which is hereby incorporated by this reference.

TECHNICAL FIELD

Aspects of this document relate generally to brewing coffee, specifically a coffee grounds stirring device.

BACKGROUND

Conventional coffee machines utilize a coffee basket to hold coffee grounds as water passes through them during the coffee brewing process. As the water passes through the coffee grounds, it picks up some of the oils, flavors, and solids from the coffee grounds before dripping into a coffee pot or other vessel. However, in conventional coffee machines, coffee grounds typically remain in the same position throughout the brewing process. Some grounds are exposed to more water than others, resulting in reduced brewing efficiency as well as lower overall quality.

Previous efforts to agitate coffee grounds during brewing resulted in large coffee makers specially designed to battle this inefficiency. However, these previous attempts would require the purchase of an entirely different coffee machine, and most coffee drinkers already have a consumer-level coffee maker. The potential increase in efficiency and quality due to stirring the coffee grounds while brewing may not warrant such a replacement, especially at the non-commercial level. Furthermore, coffee makers have a wide array of features available; it is unlikely that one or two coffee machines able to agitate coffee grounds could satisfy the demands of most coffee drinkers, each of whom likely already owns a coffee maker that meets their particular needs.

SUMMARY

According to one aspect, a coffee grounds stirring device includes a stirring basket and a stirring assembly. The stirring basket includes a basket rim, a side wall, and a basket floor. The stirring assembly is releasably coupled to the basket rim and is contained within the stirring basket. The stirring assembly includes a motor, and at least one blade operatively coupled to the motor such that the motor drives the at least one blade to rotate above the basket floor. The stirring assembly also includes a funnel having a large opening and a small opening, the large opening positioned above the motor, and the small opening positioned below the large opening. Additionally, the stirring assembly includes a housing coupled to the motor and the funnel and at least partially surrounding a control circuit, a battery compartment and a plurality of electrical contacts. The control circuit is in electrical communication with the plurality of electrical contacts and the motor. Lastly, the stirring assembly includes a sensor coupled to the funnel and proximate to the small opening. The sensor is in electrical communication with the control circuit and is configured to detect a liquid proximate the small opening. The control circuit is configured to drive the at least one blade with the motor in response to the sensor detecting liquid proximate the small opening. At least one of the side wall and the basket floor includes a mesh. The coffee grounds stirring device is sized to fit inside a coffee basket having a largest width less than five inches.

Particular embodiments may comprise one or more of the following features. The control circuit may drive the at least one blade with the motor to rotate intermittently within the stirring basket in response to the sensor detecting liquid proximate the small opening. The sensor may include a lever coupled to a reed switch in electrical communication with the control circuit. Also, the lever may be positioned beneath the small opening such that when liquid passing through the small opening hits the lever, the reed switch is activated. The control circuit may be configured to stop driving the at least one blade with the motor in response to the sensor detecting there is no more liquid proximate the small opening. Each of the at least one blade may include a lower edge proximate to and coextensive with a radius of a circle having an area equal to at least a majority of the area of the basket floor. The coffee grounds stirring device may further include a handle coupled to the housing. The housing may further include at least one mounting peg, and each of the at least one mounting pegs may be inside a hole in the basket rim, releasably coupling the stirring assembly to the basket rim. Finally, the coffee grounds stirring device may be sized to fit inside a paper coffee filter that is inside the coffee basket.

According to another aspect, a coffee grounds stirring device includes a stirring basket and a stirring assembly. The stirring basket has a basket rim, a side wall, and a basket floor. The stirring assembly is releasably coupled to the basket rim and contained within the stirring basket. The stirring assembly includes a motor, and at least one blade operatively coupled to the motor such that the motor drives the at least one blade to rotate intermittently within the stirring basket about a rotational symmetry axis of the basket floor. The stirring assembly also includes a housing coupled to the motor and at least partially surrounding a control circuit, a battery compartment and a plurality of electrical contacts. The control circuit is in electrical communication with the plurality of electrical contacts and the motor. The stirring assembly also includes a sensor coupled to the housing and in electrical communication with the control circuit. The sensor is configured to detect a liquid inside the coffee grounds stirring device. The control circuit is configured to drive the at least one blade with the motor in response to the sensor detecting liquid within the device. The control circuit is configured to control the periodicity of the intermittent rotation of the at least one blade. At least one of the side wall and the basket floor includes a mesh.

Particular embodiments may comprise one or more of the following features. The coffee grounds stirring device may be sized to be entirely contained within a coffee basket from a 12-cup-capacity coffee maker. The coffee grounds stirring device may further include a funnel having a large opening and a small opening, the large opening positioned above the motor, and the small opening positioned below the large opening. The funnel may be coupled to the housing. The sensor may be coupled to the funnel proximate the small opening. The sensor may be configured to detect a liquid proximate the small opening. The control circuit may be configured to stop driving the at least one blade with the motor in response to the sensor detecting there is no more liquid within the device.

According to yet another aspect, a coffee grounds stirring device includes a stirring assembly configured for releasable attachment to a basket rim of a stirring basket, with the stirring assembly extending into and contained within the stirring basket. The stirring assembly includes a motor, and at least one blade operatively coupled to the motor such that the motor drives the at least one blade to rotate within the stirring basket proximate to a basket floor of the stirring basket. The stirring assembly also includes a control circuit in electrical communication with the motor and configured to drive the at least one blade. The coffee grounds stirring device is sized to fit inside a coffee basket having a largest width less than five inches.

Particular embodiments may comprise one or more of the following features. The control circuit may drive the at least one blade with the motor to rotate intermittently within the stirring basket. The control circuit may control the periodicity of the intermittent rotation of the at least one blade. The coffee grounds stirring device may further include a sensor coupled to the housing and in electrical communication with the control circuit. The sensor may be configured to detect a liquid inside the coffee grounds stirring device. The control circuit may be configured to drive the at least one blade with the motor in response to the sensor detecting liquid within the device. The coffee grounds stirring device may further include a plurality of buttons. Each button may be operatively coupled to the stirring assembly in electrical communication with the control circuit and may be configured to indicate to the control circuit a pre-determined period of time for driving the motor.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

This disclosure, its aspects and implementations, are not limited to the specific device or material types, or other system component examples, or methods disclosed herein. Many additional components, manufacturing and assembly procedures known in the art consistent with device manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed devices, methods and systems, and is not intended to limit the broad aspect of the disclosed concepts to the embodiments illustrated.

FIGS. 1 through 8 depict non-limiting embodiments of a coffee grounds stirring device 100 having a stirring assembly 102; some embodiments depicted also comprise a stirring basket 104. As shown, the stirring assembly 102 includes a motor 106, two blades 108 operatively coupled to the motor 106, and a sensor 112. Coffee grounds are placed inside a stirring basket 104 or a compatible vessel, and the coffee grounds stirring assembly 102 is coupled to the top. The coffee grounds stirring device 100 is then placed in the coffee basket of a conventional coffee maker. The motor 106 drives the blades 108 to rotate in response to the sensor 112 detecting that the brewing process has begun. As the blades 108 rotate, the coffee grounds are stirred and mixed as hot water passes through them. By stirring the coffee grounds during the brewing process, they are more evenly distributed and more thoroughly exposed to the hot water, increasing the quality of the coffee and the efficiency of the brewing process.

Figure 8:
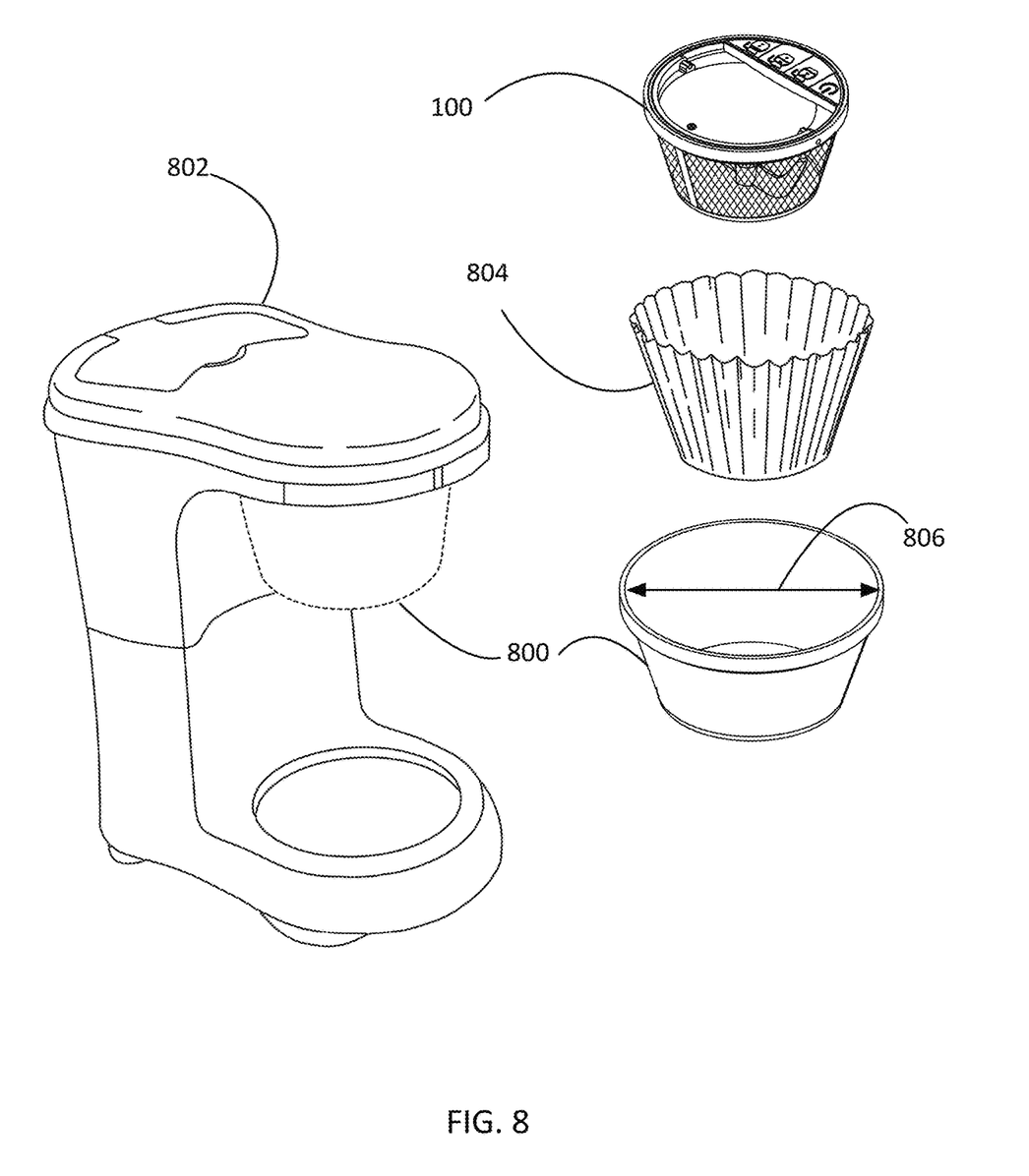
FIG. 8 is an exploded view of an exemplary use environment for a coffee grounds stirring device.

As shall be discussed in greater detail with respect to FIG. 8, the coffee grounds stirring device 100 is sized to be used in conjunction with a conventional coffee machine. See, for example, coffee machine 802 of FIG. 8. By making the coffee grounds stirring device 100 small enough to fit inside the coffee basket of a conventional coffee machine while relying on a sensor 112 to determine when to begin stirring, this device 100 may be employed in most consumer-level coffee makers without any modification to the coffee maker. Using a coffee grounds stirring device, coffee drinkers may enjoy the benefits of stirring the grounds during brewing without having to replace or modify their coffee maker, or deviate from preferred, pre-existing coffee making procedures.

In the context of the present disclosure and the claims that follow, a coffee basket refers to any vessel used to hold coffee grounds within a coffee maker during the brewing process (e.g. as hot water is passed through the grounds, etc.). The coffee basket may comprise any coffee basket known in the art. Coffee baskets are often used in conjunction with some sort of filter. Such use, as well as the dimensions of a coffee basket, are discussed in greater detail with respect to FIG. 8.

Furthermore, reference is made throughout this disclosure to a coffee maker. In the context of the present description and the claims that follow, a coffee maker may comprise any coffee machine known in the art. The coffee maker 802 shown in FIG. 8 is provided for example only, and is not meant as a limitation. Although the benefits of a coffee grind stirring device 100 will be of interest to owners of consumer-level coffee makers, it should also be recognized that the contemplated device may be used in conjunction with many commercial-level coffee makers known in the art, without departing from the scope of this disclosure.

Figure 1:
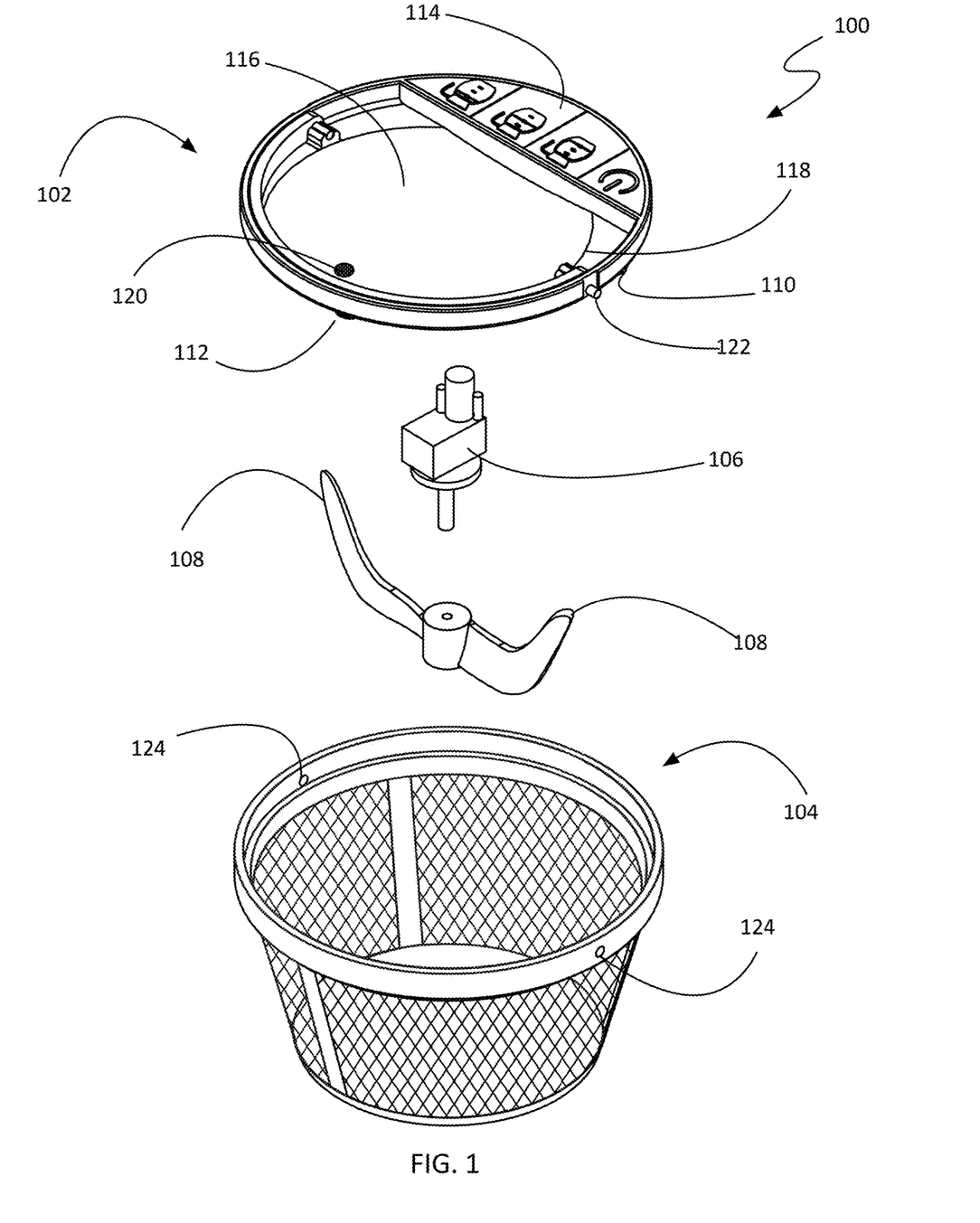
FIG. 1 is an exploded view of a coffee grounds stirring device.
Figure 2:
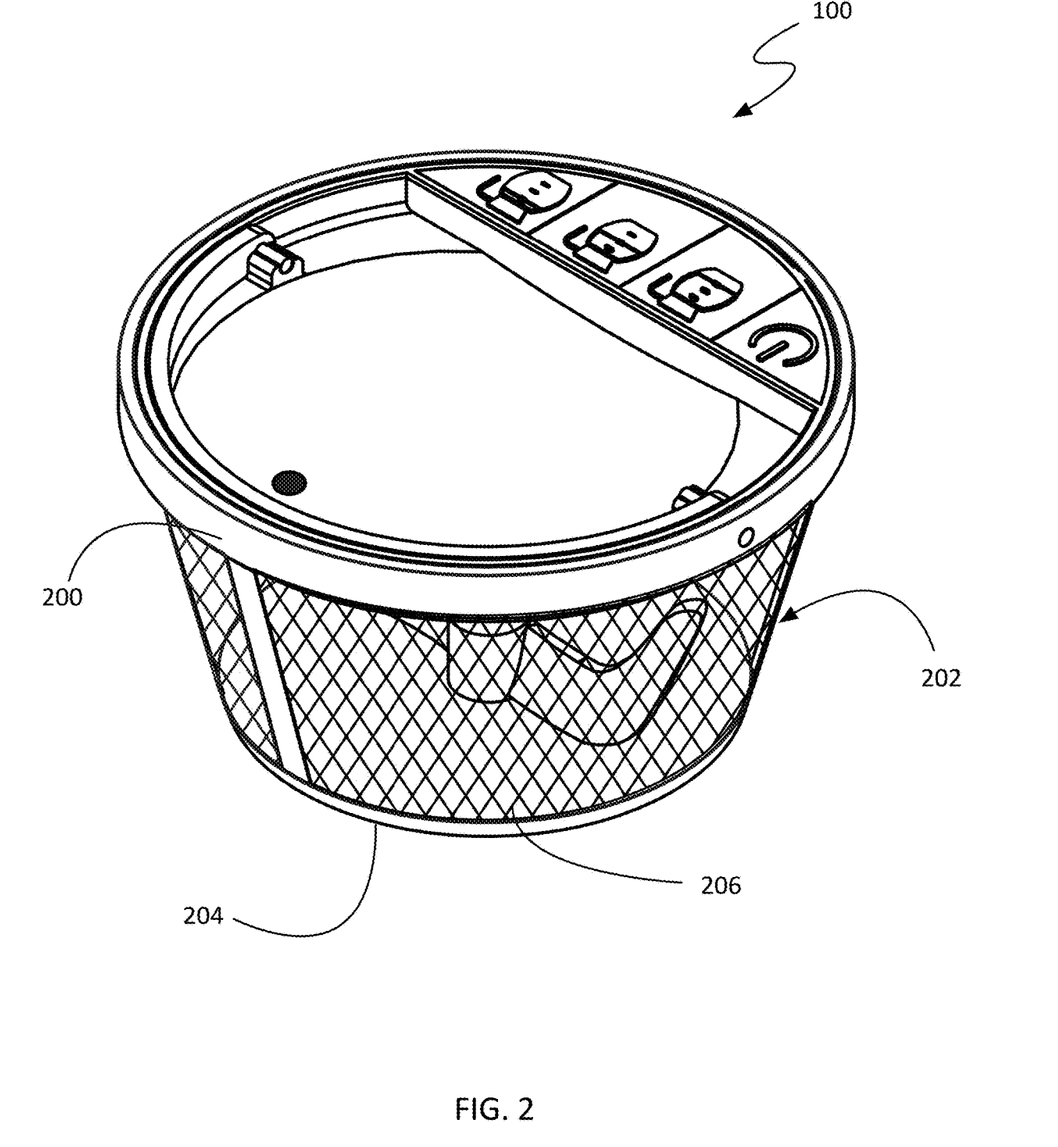
FIG. 2 is a perspective view of a coffee grounds stirring device.

FIGS. 1 and 2 depict exploded and perspective views of a non-limiting example of a coffee grounds stirring device 100, respectively. Specifically, FIGS. 1 and 2 show embodiments of a stirring device 100 having a stirring assembly 102 and a stirring basket 104. Some embodiments of the coffee grounds stirring device 100 include a stirring basket 104, while other embodiments of the device 100 are adapted for use with pre-existing vessels, such as a reusable coffee filter. The type of filter used during the brewing process can have an effect on the flavor and mouth-feel of the resulting coffee. Paper filters generally result in more clarified coffee, and also soak up some of the oils released during brewing. Reusable filters, such as metal filters, often allow more solids through, resulting in a stronger coffee with a noticeably different texture. Embodiments of the device 100 adapted for use with pre-existing vessels may allow users to incorporate the ground stirring process into their brewing without changing their method of filtration.

As shown in FIGS. 1 and 2, the stirring basket 104 comprises a basket rim 200, a side wall 202, and a basket floor 204. As shown, the stirring basket 104 is at least partially made of a mesh 206. FIGS. 1 and 2 depict a stirring basket 104 with mesh 206 only in the side wall 202. In other embodiments, the basket floor 204 may also comprise mesh 206, or the basket floor 204 may comprise mesh 206 instead of the side wall 202.

The hole size of the mesh 206 used in a stirring basket 104 may vary, depending upon the intended use for the device 100. For example, in some embodiments, where the coffee grounds stirring device 100 is intended for use inside a traditional paper filter, the mesh 206 may be wide, serving to prevent the paper filter from being pulled into a blade 108 and torn during the stirring process. In other embodiments, the stirring basket 104 may also serve as a reusable coffee filter, with a mesh 206 fine enough to filter the coffee. Those skilled in the art will recognize that a wide range of mesh hole sizes are compatible with the contemplated device, depending upon the type and context of filtration desired.

According to various embodiments, a stirring basket 104 may be constructed of a variety of materials, including plastic and metal, able to withstand the temperatures associated with brewing coffee and support the weight of the stirring assembly 102. In some embodiments, the stirring basket 104 may be composed of materials that will not easily be altered by exposure to hot coffee and coffee grounds (e.g. staining, flavor retention, odor retention, etc.). The housing 110 may also be constructed out of such materials.

As shown in FIG. 2, the stirring assembly 102 is contained within the stirring basket 104. For effective use within a conventional coffee maker, a coffee grounds stirring device 100 must balance the need for a profile low enough for use in a conventional coffee machine without collision (e.g. not being able to close a hatch or insert a coffee basket due to the size of the device 100), the need for space for the coffee grounds, and the need for unobstructed flow through the mesh 206. By placing the stirring assembly 102 inside the stirring basket 104, the size of the stirring basket 104 may be maximized without sacrificing usable volume or mesh surface area. In some embodiments, the bulk of the stirring assembly 102 may be contained entirely within the width of the basket rim 200 of the stirring basket 104. As a specific example, in one embodiment, the housing 110 and funnel 116 may be less than one inch thick.

According to various embodiments, the stirring assembly 102 may be releasably coupled to the stirring basket 104. In some embodiments the stirring assembly 102 is releasably coupled to the basket rim 200. It is advantageous to be able to separate the assembly 102 from the basket 104, for loading new coffee grounds as well as cleaning the device. The coupling between the assembly 102 and the basket 104 may be made releasable in a number of ways. As shown in the non-limiting embodiment depicted in FIG. 2, the stirring assembly 102 comprises two mounting pegs 122, aligned with two holes 124 in the basket rim 200. In some embodiments, the mounting pegs 122 may be spring-loaded or otherwise biased and extend into the interior of the basket rim 200 such that a user may press them to extend into the holes 124, coupling with the basket 104, and then press them again to cause them to retract, releasing the basket 104, similar to the mechanism of a retractable ball point pen.

Figure 3:
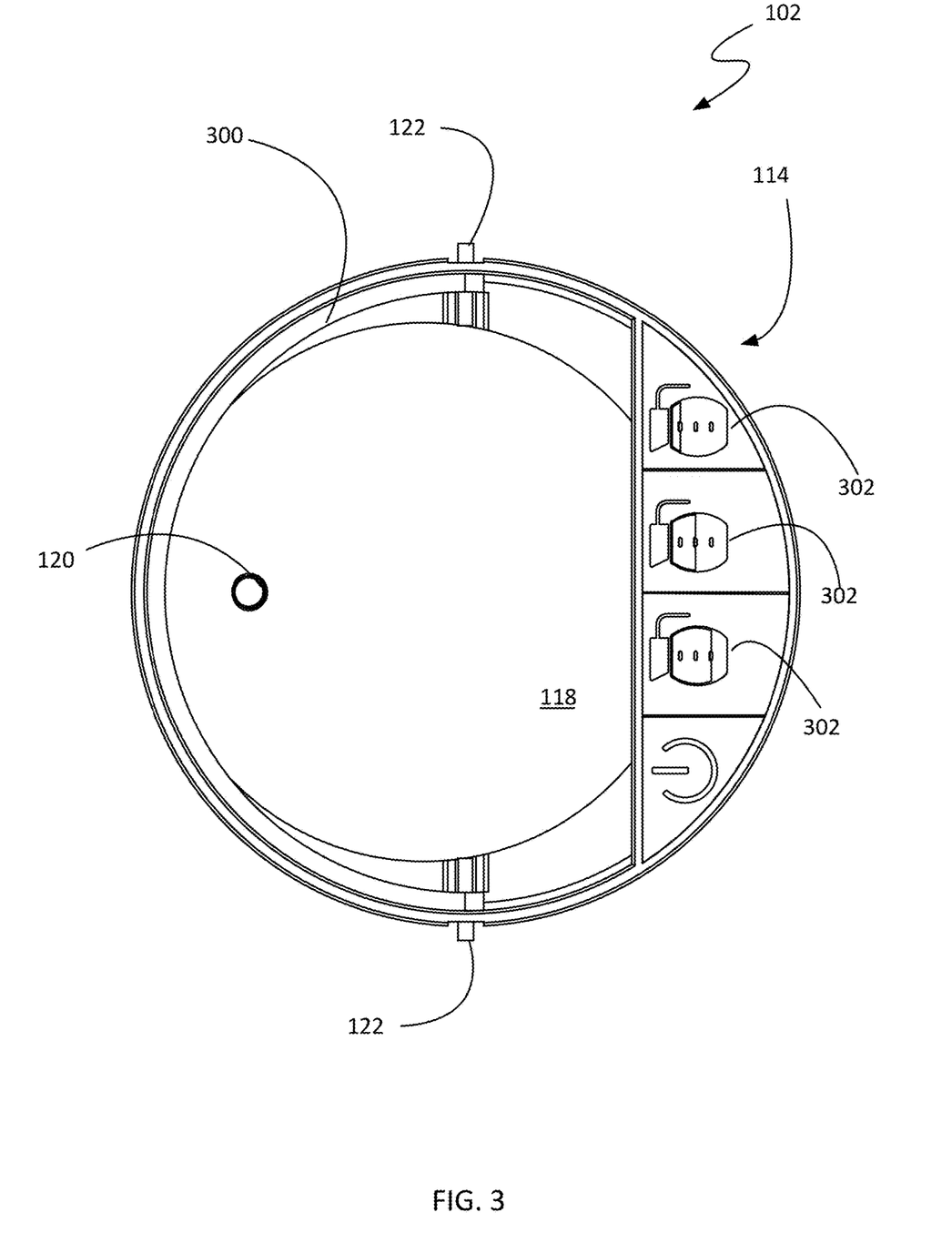
FIG. 3 is a top view of a stirring assembly of a coffee grounds stirring device.

In other embodiments, the mounting pegs 122 may be part of a flexible handle, such as handle 300 shown in FIG. 3. In such embodiments, a user may squeeze the handle to pull the pegs 122 out of their holes 124, decoupling the assembly 102 from the basket 104. In still other embodiments, a stirring assembly 102 may be releasably coupled to a stirring basket 104 using magnets. Furthermore, in some embodiments, including embodiments where a stirring assembly is adapted for use with pre-existing vessels, the coupling may be accomplished with an expanding rubber gasket around the perimeter of the stirring assembly 102. When the gasket is rotated with respect to the stirring assembly 102, it expands or contracts, creating or releasing a seal with a stirring basket 104 or other vessel.

As shown in FIGS. 1 and 2, the stirring assembly 102 includes a funnel 116, the funnel 116 having a large opening 118 and a small opening 120. Some embodiments, including those depicted in FIGS. 1 and 2, are intended to be compatible with a variety of conventional coffee makers. While most coffee makers operate on similar principles of adding hot water to coffee grounds, they execute these principles in different ways. For example, one coffee maker may introduce hot water to the coffee basket near the edge while another may pour directly into the center. The funnel 116 allows the liquid to be introduced to the device 100 in a variety of locations within the large opening 118, all leading to the small opening 120. Many coffee makers make an effort to spread the water over the all the grounds; since the grounds will be stirred during the brewing process, the introduction of the liquid to the grounds through a single point (e.g. the small opening 120 of the funnel 116) is not disadvantageous.

In other embodiments, a partially inverted funnel may be employed, where instead of a small opening, the liquid is gathered in a crescent shaped valley with a curved clot at the bottom. Such a funnel would peak near the middle, rather than be at a minimum. This may be advantageous, as it may provide space for other elements of the stirring assembly 102, such as a housing 110 and/or a motor 106, close to the central axis of the device, while still collecting fluid.

Other embodiments may not include a funnel 116. For example, in some embodiments, the stirring assembly 102 may be minimized with respect to the area used with the basket rim 200, leaving much of the stirring basket 104 and its contents exposed. While this approach may require an adjustment of the coffee grounds stirring device 100 within the coffee basket to prevent watering the top of the assembly (possibly splashing and causing a mess), the exposed stirring basket 104 may facilitate the addition of coffee grounds to the device 100.

As shown in FIGS. 1 through 3, the stirring assembly 102 includes a plurality of buttons 114. As depicted, these are mechanisms that are able to receive and pass along user input. It should be clear to those skilled in the art that these may be substituted with other input devices, including but not limited to switches, knobs, levers, touch screens, and the like, without departing from the scope and spirit of the disclosure. In some embodiments, the plurality of buttons 114 may be covered with a flexible, watertight membrane, to protect against the introduction of liquid during the brewing process. The plurality of buttons may be employed to receive various forms of input from a user, including toggling the device 100 between an "off" state in which no power is being used, and a "standby" state, in which a sensor 112 is able to determine if the brewing process has begun.

The plurality of buttons 114 may also be employed to select a period of time for which the motor 106 will be driven. See, for example, FIG. 3, where three of the buttons 114 are labeled with coffee pots filled to different levels. Each of those buttons 114 corresponds with a pre-determined period of time 300 to stir the depicted amount of coffee to be brewed. In other embodiments, the time may be indicated in minutes. As an option, the selected period of time may be indicated with an LED next to the selected button 114. In still other embodiments, the time may be specified through a more granular interface, such as a knob or dial. A period of time may be chosen or defined using any methods of input known in the art.

Figure 4:
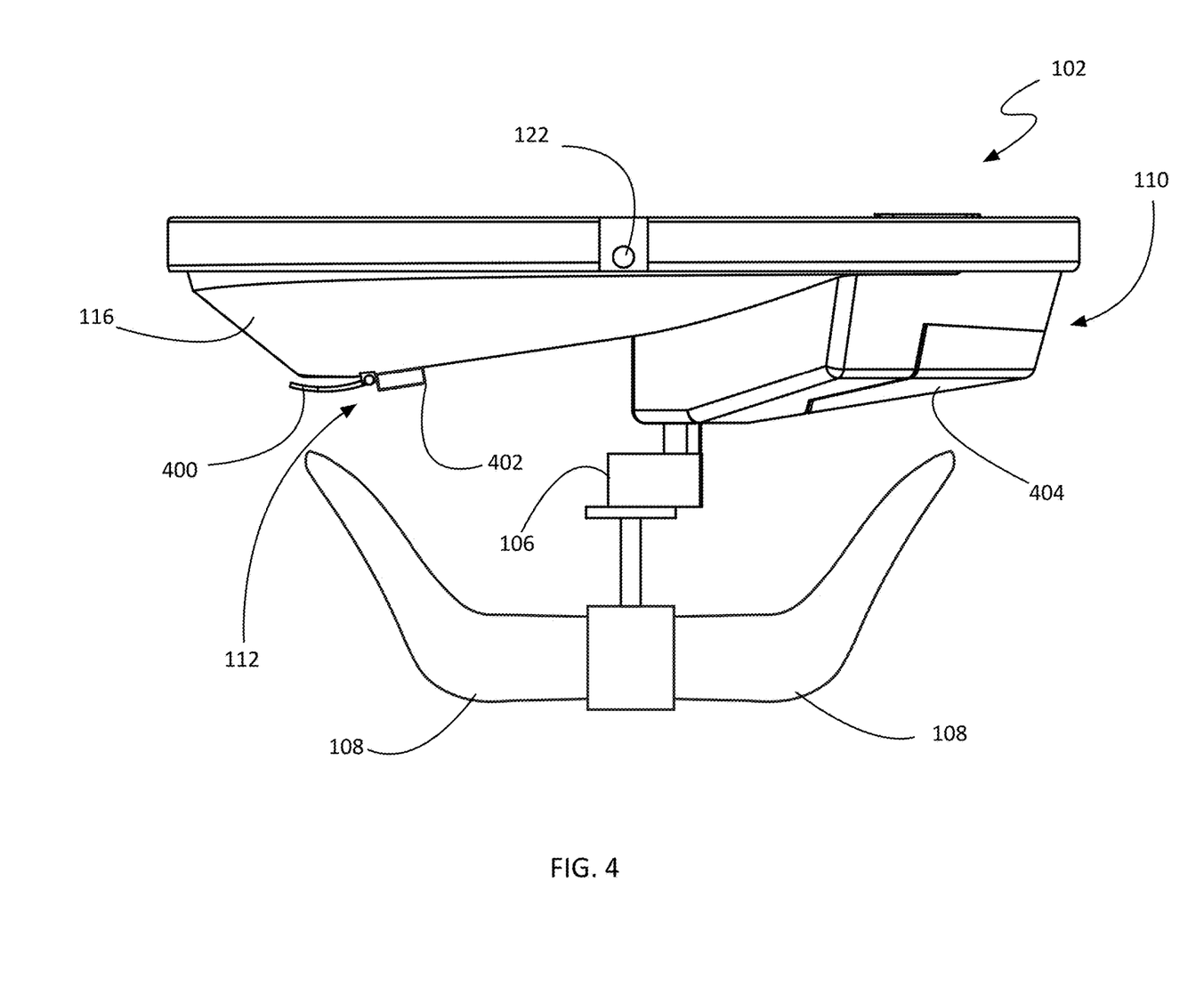
FIG. 4 is a side view of a stirring assembly of a coffee grounds stirring device.
Figure 5:
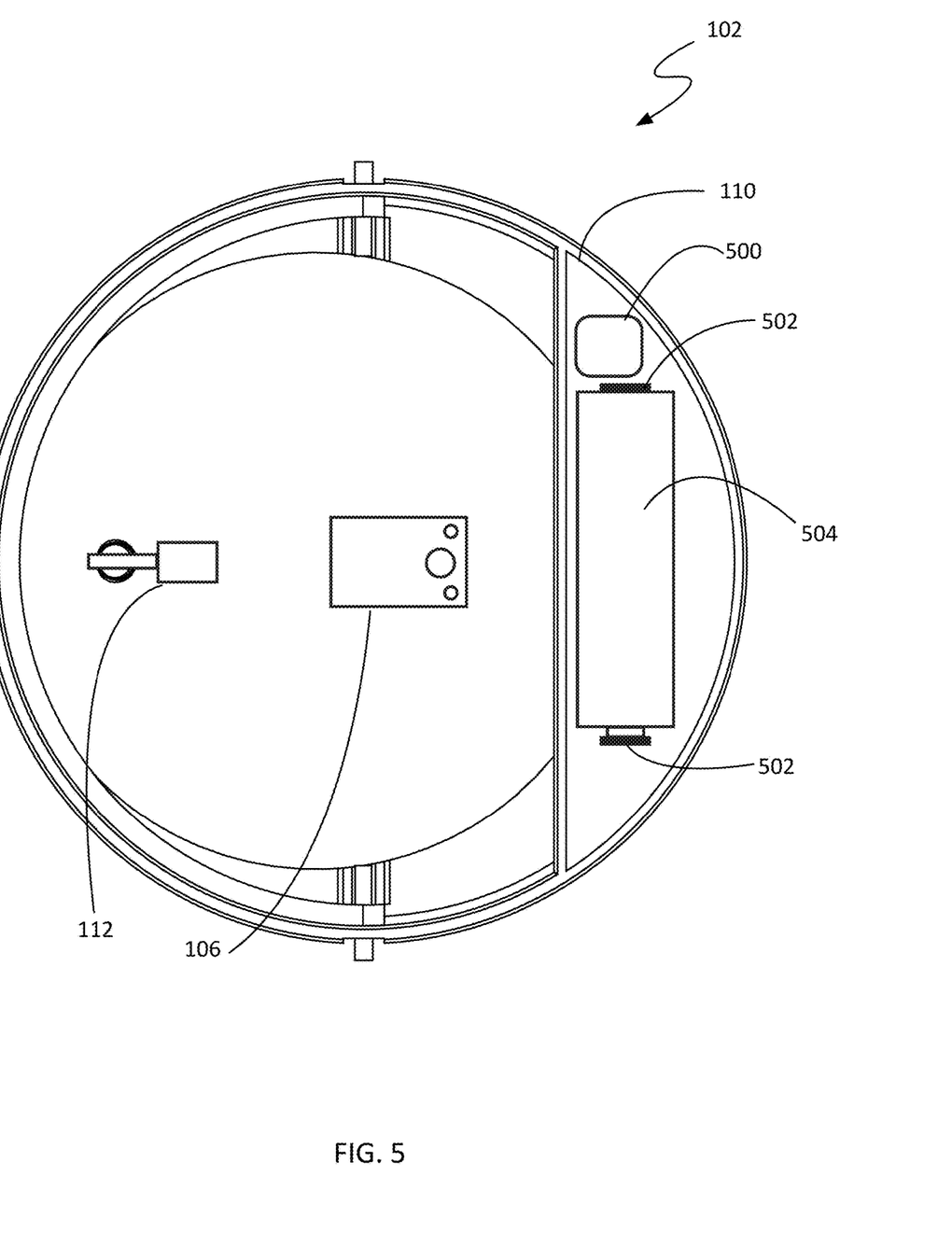
FIG. 5 is a top view of a stirring assembly of a coffee grounds stirring device, with transparency.

FIGS. 3 through 5 show a stirring assembly 102, according to various embodiments. FIG. 3 shows a top view of a stirring assembly 102, while FIG. 5 shows the same top view, but with the upper layer of the assembly 102 (including the funnel 116) made transparent, such that the interior of the housing 110 and the bottom of the funnel 116 is visible. FIG. 4 shows a side view of the stirring assembly 102.

As shown, the assembly 102 includes a handle 300 that is movably coupled to the rest of the stirring assembly 102, such that it can fold down flush with the assembly 102 when not in use. The handle 300 is advantageous in inserting and removing the device 100 from a coffee basket 800, and may also play a role in the releasable nature of the coupling between the stirring assembly 102 and a stirring basket 104, as previously discussed. Some embodiments may have a handle 300, such as a lip, incorporated into the housing 110 or other part of the assembly 102 such that the device may be lifted by a low profile handle without any moving parts that may wear out or break.

FIG. 4 shows a side view of a non-limiting example of a stirring assembly 102 having a sensor 112 comprising a lever 400 and a reed switch 402. The lever 400 is positioned beneath the small opening 120 of the funnel 116, such that when a liquid enters the funnel 116 and passes through the small opening 120, it will hit the lever 400 and trigger the reed switch 402. In other embodiments, the reed switch 402 may be replaced with other mechanical switches of the like.

Some embodiments of the coffee grounds stirring device 100 may employ mechanical switches to determine if stirring is needed or not, such as the reed switch 402 shown in FIG. 4. Other embodiments may employ other types of sensors. For example, in one embodiment, the sensor 112 may comprise one or more pairs of conductors disposed around the small opening 120 of the funnel 116, or around other locations where the presence of liquid during the brewing process is predictable. The liquid completes the circuit between two conductors; the completed circuit indicates the initiation of the brew process.

In another embodiment, a sensor 112 may determine the temperature of some object or surface within the coffee grounds stirring device 100, such as the funnel 116. A sharp rise in temperature may indicate the start of the brewing process. In yet another embodiment, the sensor 112 may comprise a motion detector, which may detect the introduction of water to the interior of the stirring basket 104. Advantageously, a single motion detector may monitor the entire interior of the basket 104, making it compatible with stirring assemblies that do not include a funnel.

In some embodiments, a single sensor 112 may be used. In other embodiments, multiple sensors 112 may be positioned throughout the coffee grounds stirring device 100. The sensor 112 may determine whether or not the brew process is happening using a variety of input, including, but not limited to, light, conduction, sound, pressure, and the like.

As shown in FIG. 4, the stirring assembly 102 includes a battery compartment 404 in the housing 110. According to various embodiments, the coffee grounds stirring device 100 may be battery powered, allowing it to be used with most conventional coffee makers without modification or adjustment (e.g. a power wire hanging out of a brewing chamber, etc.). In some embodiments, a rechargeable battery may power the device 100. As a specific example, the device 100 may have a rechargeable battery completely sealed inside the housing, and which can be charged through induction. By not having a battery compartment 404 that opens, the assembly 102 is more water tight. As an option, the assembly 102 may be charged when placed on a waterproof induction mat to dry after being washed.

In other embodiments, the coffee grounds stirring device 100 may be charged and/or powered directly from other power sources. For example, in one embodiment, the device may draw power from a thermoelectric material, which converts a temperature gradient directly into electricity. Such a temperature gradient may be obtained from the hot water used to brew the coffee, or from the heat of the brewed coffee itself.

FIG. 5 shows a top view of a stirring assembly 102, with the top layer (including the buttons 114 and the funnel 116) made transparent to show the interior of the housing 110, and the underside of the funnel 116. As shown, the housing 110 contains a control circuit 500, a plurality of electrical contacts 502, and a battery 504; also shown is the motor 106 and the sensor 112. These elements are in electrical communication with each other. The control circuit 500 drives the motor 106 in response to a state change of a sensor 112, and in a way defined by the buttons 114, according to various embodiments.

In some embodiments, the control circuit 500 may drive the motor 106 to rotate the at least one blade 108 at a particular speed. As a particular example, the control circuit 500 may drive the motor 106 to rotate the blades 108 at a speed between 60 and 120 rotations per minute. In some embodiments, the rotation speed may be pre-determined. In other embodiments, the rotation speed may be determined at the time of use, and may be based upon factors including resistance experienced by the blades, type of beverage being made, user preference, a concentration of dissolved solids present in the brewed liquid, and the like. In still other embodiments, the control circuit 500 may drive the motor 106 to rotate the blades 108 at different speeds depending on the stage of the brewing process. For example, it may rotate slowly at first, to saturate the grounds with liquid, and then increase speed once saturation has occurred.

According to various embodiments, the control circuit 500 may drive the motor 106 to rotate the blades 108 intermittently, rather than rotating constantly throughout the brewing process. The use of intermittent rotation is advantageous, as it preserves battery life, and has been shown to yield results similar to those rendered by constant stirring. In some embodiments, the control circuit 500 may drive the rotation intermittently with a predefined periodicity, while in other embodiments the periodicity may be defined by the user, or by the control circuit 500 in response to one or more inputs from a sensor 112.

As shown in FIG. 5, the control circuit 500 is in electrical communication with the sensor 112. According to various embodiments, the control circuit 500 may start driving the motor 106 to rotate the blades 108 in response to input from a sensor 112. As an option, the control circuit 500 may start driving the motor 106 immediately upon receiving such an input from the sensor 112, or it may start the rotations once a predetermined period of time has elapsed since the initial detection of liquid by the sensor. This may allow the liquid time to saturate the grounds.

In some embodiments, the control circuit 500 may stop driving the motor 106 in response to an input from a sensor 112, such as an absence of liquid at the small opening 120 of the funnel 116. The control circuit 500 may halt the rotation immediately upon receiving such an input, or may start a timer that will halt the rotation, as there may still be liquid in the grounds even though the flow has stopped in the funnel 116. In other embodiments, the control circuit 500 may halt the rotations after a predetermined (or user selected) period of time has elapsed.

The control circuit 500 may also drive the motor 106 to rotate the blades 108 for reasons other than stirring, according to various embodiments. For example, in one embodiment, after stirring has halted and the brew process is complete, the control circuit 500 may drive the blades to "wiggle", rotating back and forth a small amount to push the used coffee grounds off of and away from the blades 108, facilitating clean up and preventing grounds from falling off the blades 108 when the assembly 102 is decoupled from the basket 104. In another embodiment, the control circuit 500 may vibrate the blades 108 rapidly to assist in lowering them into a stirring basket filled with coffee grounds. The vibration may help the blades 108 to burrow into the grounds, making it easier to insert the assembly 102 far enough into the basket 104 that the two may be coupled. The vibration may be driven in response to input from a sensor, such as a pressure sensor or an accelerometer.

Figure 6:
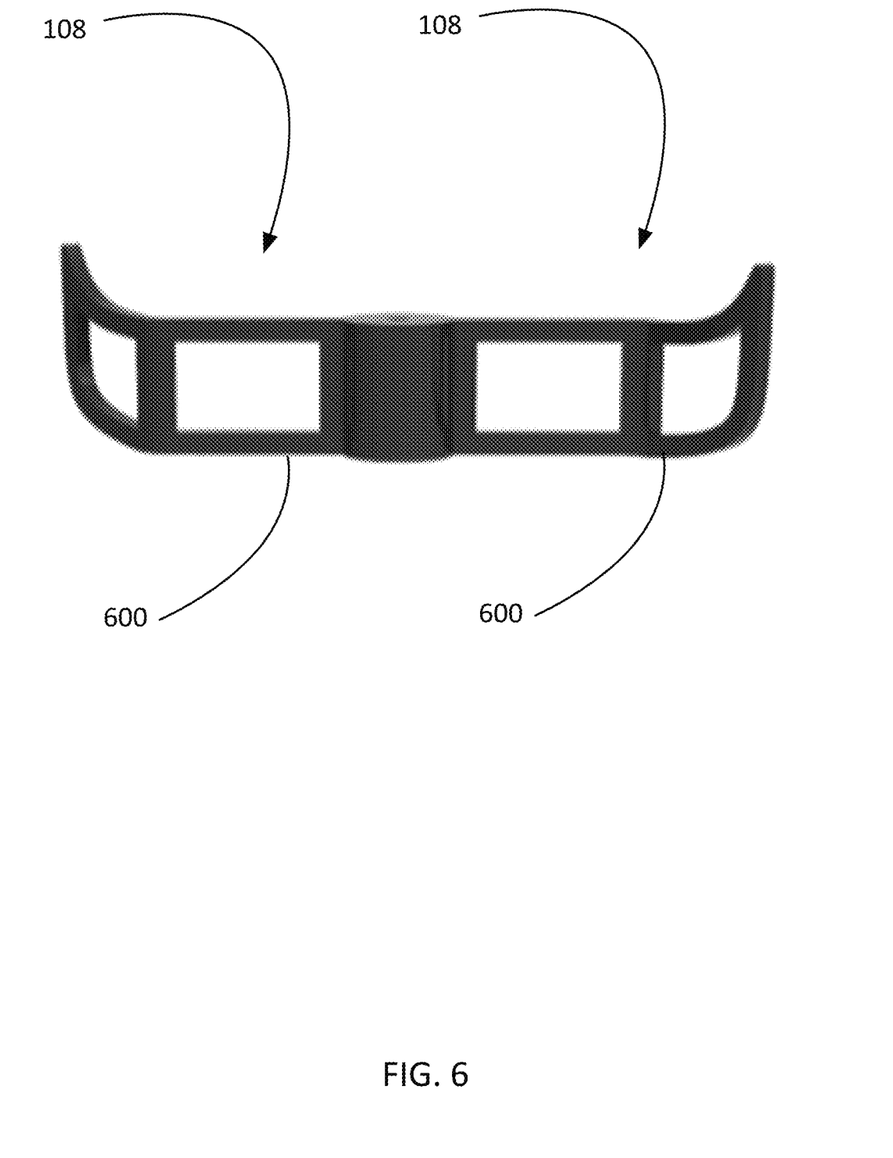
FIG. 6 is a side view of a blade of a coffee grounds stirring device.
Figure 7:
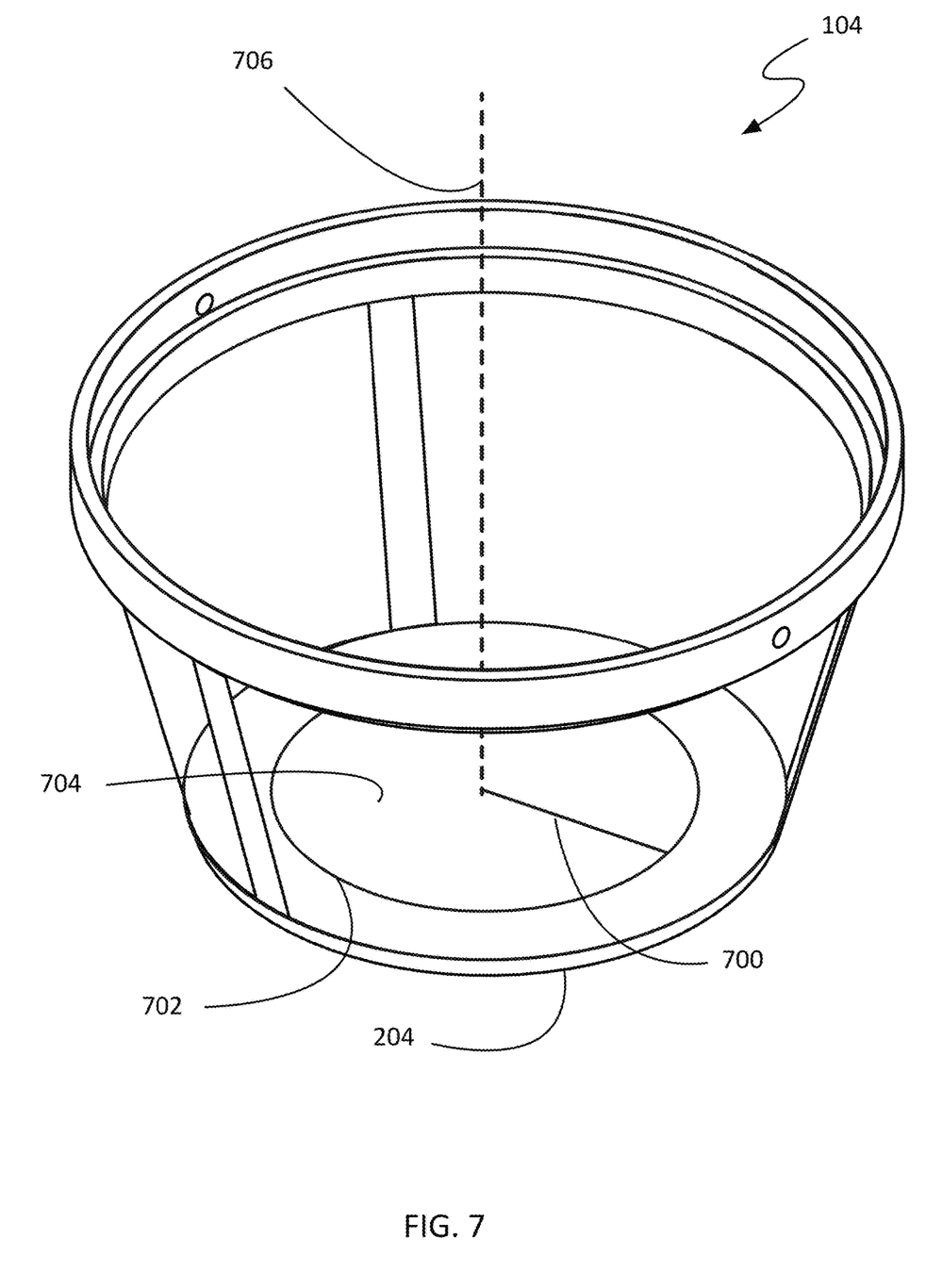
FIG. 7 is a perspective view of a stirring basket of a coffee grounds stirring device.

FIG. 6 shows a side view of blades 108 from a stirring assembly 102, and FIG. 7 shows the environment in which they rotate, specifically, a stirring basket 104. As shown in the non-limiting examples of FIG. 6 as well as FIGS. 1, 2, and 4, a blade 108 comprises a lower edge 600 that is proximate the basket floor 204 when the stirring assembly 102 is coupled to the stirring basket 104. In some embodiments, the lower edge 600 is close enough to the basket floor 204 to agitate the coffee grounds stuck at the very bottom of the stirring basket 104 such that they are exposed to additional water. As an option, the lower edge 600 may be closer than half the average thickness of a coffee bean, to prevent a rogue bean from jamming the blade 108.

In some embodiments, the lower edge 600 may be coextensive with a radius 700 of a circle 702 having a surface area 704 equal to at least a majority of the surface area of the basket floor 204. See, for example, FIG. 7. In other embodiments, only portions of the lower edge 600 of a blade 108 may be proximate the basket floor 204.

As shown, a stirring assembly 102 may comprise two blades 108 opposite each other, according to some embodiments. In other embodiments, a single blade 108 may be used. In still other embodiments, multiple blades 108 may be used. The blades may be homogenous, or one or more may be different. Some blades may extend along the side wall 202 of the basket 104, while other blades may extend into the central area of the basket 104.

According to some embodiments, a motor 106 drives the blades 108 to rotate above the basket floor 204 on a rotational symmetry axis 706 of the basket floor 204. In other embodiments, the blades may rotate about a different axis. For example, in one embodiment, a blade may rotate about an axis which is itself processing along an orbit within the stirring basket 104.

FIG. 8 shows an exploded view of an exemplary use environment for a coffee grounds stirring device 100. According to various embodiments, a coffee grounds stirring device 100 is sized so it may fit within the coffee basket 800 of a conventional coffee maker 802. As a specific example, in one embodiment, the device 100 may have dimensions such that it will fit entirely within the coffee basket 800 of a standard 12-cup-capacity coffee maker. In another embodiment, the device may be sized to fit in a coffee basket 800 having a largest width 806 less than five inches.

The type of filter used to brew coffee is often a matter of personal preference. Some embodiments of a coffee grounds stirring device 100 may be placed inside a paper coffee filter 804, which is then trapped between the inside of the coffee basket 800 and the outside of the stirring basket 104 during the brewing process. As an option, the device 100 may be used with other types of filters, such as reusable filters.

Where the above examples, embodiments and implementations reference examples, it should be understood by those of ordinary skill in the art that other coffee grounds stirring devices and examples could be intermixed or substituted with those provided. In places where the description above refers to particular embodiments of coffee grounds stirring devices and customization methods, it should be readily apparent that a number of modifications may be made without departing from the spirit thereof and that these embodiments and implementations may be applied to other coffee related technologies as well. Accordingly, the disclosed subject matter is intended to embrace all such alterations, modifications and variations that fall within the spirit and scope of the disclosure and the knowledge of one of ordinary skill in the art.

What is claimed is:

1. A coffee grounds stirring device, comprising:
   a stirring basket having a basket rim, a side wall, and a basket floor;
   a stirring assembly releasably coupled to the basket rim and contained within the stirring basket, the stirring assembly comprising:
   a motor;
   at least one blade operatively coupled to the motor such that the motor drives the at least one blade to rotate above the basket floor;
   a funnel having a large opening and a small opening, the large opening positioned above the motor, and the small opening positioned below the large opening;
   a housing coupled to the motor and the funnel and at least partially surrounding a control circuit, a battery compartment and a plurality of electrical contacts, the control circuit in electrical communication with the plurality of electrical contacts and the motor; and
   a sensor coupled to the funnel and comprising a lever coupled to a mechanical switch in electrical communication with the control circuit;
   wherein the lever of the sensor is positioned beneath the small opening such that when a liquid passing through the small opening hits the lever the mechanical switch is activated;
   wherein the control circuit is configured to drive the at least one blade with the motor in response to the sensor detecting liquid passing through the small opening;
   wherein at least one of the side wall and the basket floor comprise a mesh; and
   wherein the coffee grounds stirring device is sized to fit inside a coffee basket of a coffee maker having a largest width less than five inches.

2. The coffee grounds stirring device of claim 1, wherein the control circuit drives the at least one blade with the motor to rotate intermittently within the stirring basket in response to the sensor detecting liquid passing through the small opening.

3. The coffee grounds stirring device of claim 1: wherein the mechanical switch is a reed switch.

4. The coffee grounds stirring device of claim 1, wherein the control circuit is configured to stop driving the at least one blade with the motor in response to the sensor detecting there is no more liquid passing through the small opening.

5. The coffee grounds stirring device of claim 1, wherein each of the at least one blade comprises a lower edge coextensive with a radius of a circle above, parallel to, and having an area equal to at least a majority of the area of, the basket floor.

6. The coffee grounds stirring device of claim 1, further comprising:
   a handle coupled to the housing;
   wherein the housing further comprises at least one mounting peg; and
   wherein each of the at least one mounting pegs is inside a hole in the basket rim, releasably coupling the stirring assembly to the basket rim.

7. The coffee grounds stirring device of claim 1, wherein the coffee grounds stirring device is sized to fit inside a paper coffee filter that is inside the coffee basket.

8. A coffee grounds stirring device, comprising:
   a stirring basket having a basket rim, a side wall, and a basket floor;
   a stirring assembly releasably coupled to the basket rim and contained within the stirring basket, the stirring assembly comprising:
   a motor;
   at least one blade operatively coupled to the motor such that the motor drives the at least one blade to rotate intermittently within the stirring basket about a rotational symmetry axis of the basket floor;
   a housing coupled to the motor and at least partially surrounding a control circuit, a battery compartment and a plurality of electrical contacts, the control circuit in electrical communication with the plurality of electrical contacts and the motor; and
   a sensor coupled to the housing and in electrical communication with the control circuit, the sensor comprising one of a conduction sensor, a temperature sensor, and a mechanical switch, and configured to detect a liquid inside the coffee grounds stirring device by sensing a change in one of conduction, temperature, and force caused by the liquid;
   wherein the control circuit is configured to drive the at least one blade with the motor in response to the sensor detecting liquid within the device;
   wherein the control circuit is configured to control the periodicity of the intermittent rotation of the at least one blade; and
   wherein at least one of the side wall and the basket floor comprise a mesh.

9. The coffee grounds stirring device of claim 8, wherein the coffee grounds stirring device is sized to be entirely contained within a flat-bottomed coffee basket from a conventional 12-cup-capacity coffee maker.

10. The coffee grounds stirring device of claim 9, wherein the coffee grounds stirring device is sized to fit inside a paper coffee filter that is inside the coffee basket.

11. The coffee grounds stirring device of claim 8, further comprising:
a funnel having a large opening and a small opening, the large opening positioned above the motor, and the small opening positioned below the large opening;
wherein the funnel is coupled to the housing.

12. The coffee grounds stirring device of claim 11:
wherein the sensor is coupled to the funnel and comprises a lever coupled to a mechanical switch; and
wherein the lever of the sensor is positioned beneath the small opening such that when a liquid passing through the small opening hits the lever the mechanical switch is activated.

13. The coffee grounds stirring device of claim 8:
wherein the control circuit is configured to stop driving the at least one blade with the motor in response to the sensor detecting there is no more liquid within the device.

14. A coffee grounds stirring device, comprising:
a stirring assembly releasably coupled to a basket rim of a stirring basket with the stirring assembly extending into and contained within the stirring basket, the stirring assembly comprising:
a motor;
at least one blade operatively coupled to the motor such that the motor drives the at least one blade to rotate within the stirring basket; and
a control circuit in electrical communication with the motor and configured to drive the at least one blade; and
wherein the coffee grounds stirring device is sized to fit inside a coffee basket of a coffee maker having a largest width less than five inches.

15. The coffee grounds stirring device of claim 14, wherein the coffee grounds stirring device is sized to fit inside a paper coffee filter that is inside the coffee basket.

16. The coffee grounds stirring device of claim 14:
wherein the control circuit drives the at least one blade with the motor to rotate intermittently within the stirring basket; and
wherein the control circuit controls the periodicity of the intermittent rotation of the at least one blade.

17. The coffee grounds stirring device of claim 14, further comprising:
a sensor coupled to the housing and in electrical communication with the control circuit, the sensor comprising one of a conduction sensor, a temperature sensor, and a mechanical switch, and configured to detect a liquid entering the coffee grounds stirring device by sensing a change in one of conduction, temperature, and force caused by the liquid;
wherein the control circuit is configured to drive the at least one blade with the motor in response to the sensor detecting liquid entering the device.

18. The coffee grounds stirring device of claim 17:
wherein the control circuit is configured to stop driving the at least one blade with the motor in response to the sensor detecting there is no more liquid entering the device.

19. The coffee grounds stirring device of claim 14, further comprising:
a plurality of buttons, each button operatively coupled to the stirring assembly in electrical communication with the control circuit and configured to indicate to the control circuit a pre-determined period of time for driving the motor.

20. The coffee grounds stirring device of claim 14, further comprising:
a funnel having a large opening and a small opening, the large opening positioned above the motor, and the small opening positioned below the large opening; and
wherein the funnel is coupled to the housing.

* * * * *